(No Model.)

H. W. EDDY.
SCREW TAP.

No. 300,961. Patented June 24, 1884.

WITNESSES:
Theo. G. Hoster
C. Sedgwick

INVENTOR:
H. W. Eddy
BY Munn & Co
ATTORNEYS.

UNITED STATES PATENT OFFICE.

HENRY WILLCOX EDDY, OF TOLEDO, OHIO.

SCREW-TAP.

SPECIFICATION forming part of Letters Patent No. 300,961, dated June 24, 1884.

Application filed January 4, 1884. (No model.)

*To all whom it may concern:*

Be it known that I, HENRY W. EDDY, of Toledo, in the county of Lucas and State of Ohio, have invented a new and Improved Tap for Cutting Screw-Threads, of which the following is a full, clear, and exact description.

The object of my invention is to provide a new and improved tap for cutting screw-threads, which tap has removable cutters, which are held in the cutter-head by novel means.

The invention consists in the construction and arrangement of parts, as will be hereinafter fully described and claimed.

Reference is to be had to the accompanying drawings, forming part of this specification, in which similar letters of reference indicate corresponding parts in all the figures.

Figure 1:
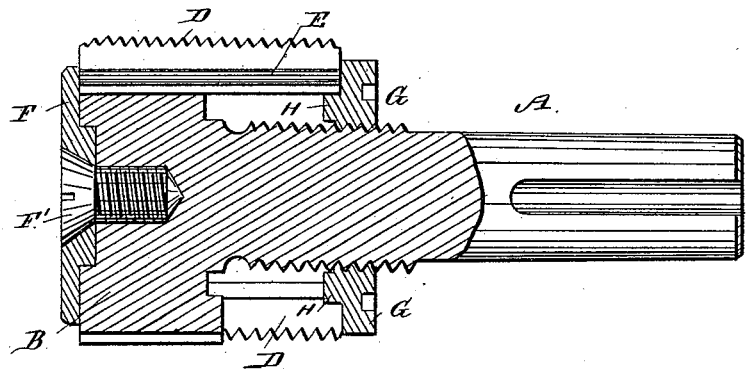
Figure 2:
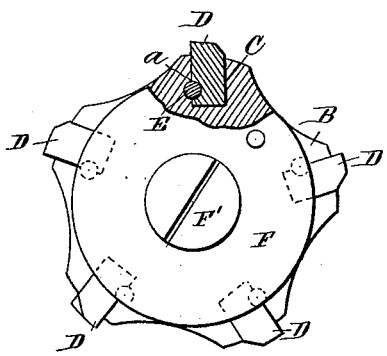
Figure 3:
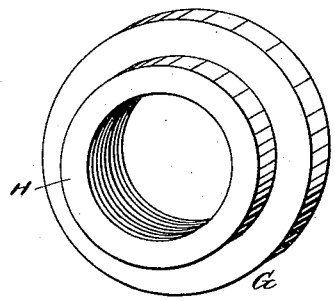

Figure 1 is a longitudinal sectional elevation of my improved tap for cutting screw-threads. Fig. 2 is an end view of the same, parts being broken out and others shown in section. Fig. 3 is a perspective view of the locking-ring.

The stock A is provided at its end with a head, B, provided in its rim with a series of grooves, C, parallel with the stock A, which grooves are adapted to receive the cutters D, the outer ends of which are to be held flush with the end of the head. The grooves C are provided in one side with a longitudinal groove, a, and the corresponding surfaces of the cutters are provided with like grooves a. Locking wires or pins E are passed into the aperture formed by the grooves a, for the purpose of preventing the cutters from being lifted out of the grooves. A disk, F, held on the end of the cutter-head by a screw, F', partly overlaps the outer ends of the cutters and prevents the cutters sliding out of the grooves in the direction toward the end of the head B. The stock A is screw-threaded, and on it is mounted a ring or nut, G, provided in the inner surface, or surface facing toward the head B, with an annular ridge, H, on which the inner ends of the cutters D rest.

The cutting-teeth at the front ends of the cutters wear off more rapidly than the rear parts, and if they become too dull to cut the disk F is removed and the cutters are moved forward to project from the end of the head by turning the nut G. The ends of the cutters are then ground off flush with the end surface of the head.

Having thus described my invention, what I claim as new, and desire to secure by Letters Patent, is—

1. In a tap, the combination, with the threaded stock A, having a head, B, longitudinally grooved in its periphery, of the cutters D, held to slide longitudinally in said grooves, but not vertically, the disk F, removably secured to the outer end of the head, and the nut G, for forcing the cutters outward when the disk F has been removed, substantially as set forth.

2. In a tap, the combination, with the threaded stock A, having a head, B, provided with longitudinal slots in its periphery, of the longitudinally-sliding cutters D, held in said slots, a removable plate on the outer end of the head for the cutters to rest against, and a nut, G, on the screw-threaded portion, for clamping the cutters in place and forcing them outward when the said plate is removed, an annular ring, H, being formed on the inner surface of the nut for the inner ends of the cutters to rest in, substantially as set forth.

3. In a tap, the combination, with the threaded stock A, having a head, B, provided with longitudinal grooves in the rim, of the cutters D, held in the said grooves, the locking wires or pins E, the disk F, held on the end of the head, and the nut G, provided with an annular ridge, H, on which the inner ends of the cutters D rest, substantially as herein shown and described.

HENRY WILLCOX EDDY.

Witnesses:
J. C. RIKE,
J. R. LINN.